July 9, 1968 V. FLEISCHER ET AL 3,391,871
FUEL INJECTION VALVE FOR INTERNAL COMBUSTION ENGINES
Filed March 30, 1967
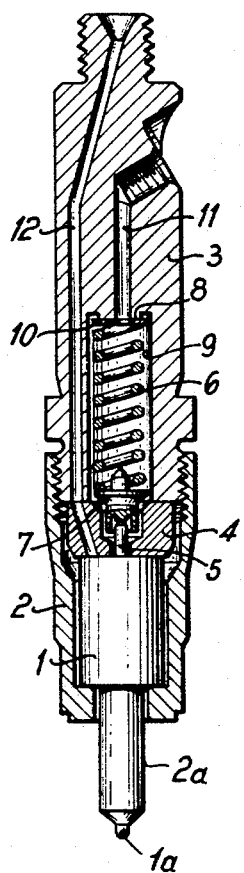
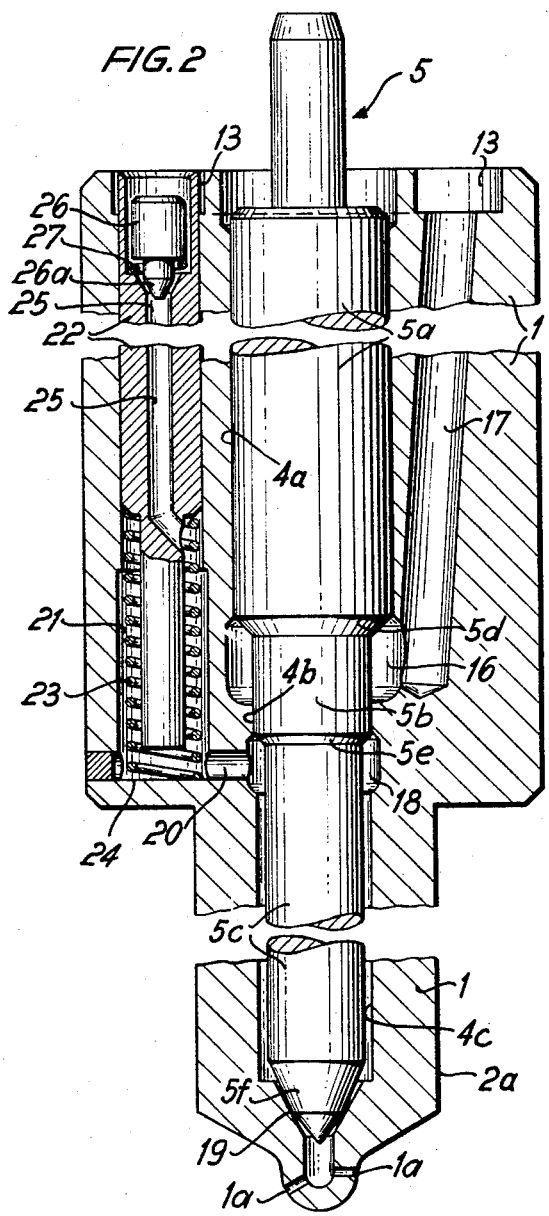
INVENTORS
Volkmar Fleischer
Josef Steiner
by
Edwin E. Greigg
ATTORNEY 3,391,871
FUEL INJECTION VALVE FOR INTERNAL
COMBUSTION ENGINES
Volkmar Fleischer, Wolfsburg, and Josef Steiner, Korb,
Germany, assignors to Robert Bosch G.m.b.H., Stuttgart, Germany, a German company
Filed Mar. 30, 1967, Ser. No. 627,007
8 Claims. (Cl. 239—533)

ABSTRACT OF THE DISCLOSURE

A fuel injection valve of the type supplied with fuel from a main fuel line for a preliminary and subsequent main fuel injection into an internal combustion engine by the opening and closing of a valve needle reciprocably disposed therein and urged against the valve seat by a spring, a preliminary injection piston reciprocable in a pilot chamber and communicating with said valve needle to inject a predetermined amount of fuel in the pilot chamber, independently of engine speed, by requiring the piston to travel a predetermined full stroke in its pilot chamber. Upon completion of the preliminary injection, a further increase in fuel pressure will overcome the spring bias on the valve needle for the main injection; the fuel for which is supplied directly, thus bypassing the preliminary injection piston chamber. A check valve in the preliminary injection piston spring biased to open with a reduction in pressure in the main fuel line eliminates excess or negative pressures and provides uniform reloading of the spaces within the injection valve.

Background of the invention

*Field of the invention.*—This invention relates to a fuel injection valve for a preliminary and subsequent main injection of fuel into internal combustion engines. More particularly, the invention concerns a fuel injection valve whose valve needle opens under the pressure of the fuel in the main fuel line and against the force of a spring, and which is also provided with a preliminary injection piston also subjected to said fuel pressure. During the first phase of its operation, the preliminary injection piston displaces a quantity of preliminary injection into a pressure chamber of the injection valve until, after further increase in the fuel pressure in the main fuel line, the valve needle for the main injection opens. Such a system is generally described in United States Patent to Bischof No. 2,173,814.

*Description of the prior art*

In the known injection valves of the above-outlined type, the valve needle for the main injection may open before the preliminary injection piston has traveled its full stroke. This causes a reduction in the quantity of the preliminary injection since, in these valves, the preliminary injection piston—after having completed a predetermined path of its preliminary injection stroke—clears an opening through which the fuel from the main fuel line will then flow under pressure to a loading piston. Yielding to this pressure, the loading piston will clear a supply channel to admit the amount of the main injection to the pressure chamber of the injection valve. In view of the fact that the amount of the main injection, too, flows through the bore controlled by the preliminary injection piston, the cross-section being opened by the preliminary injection piston must be sufficiently large so that this quantity may flow therethrough even at high engine speed without major pressure loss. In addition, it is to be noted that, for example, in vehicle engines, the amount of preliminary injection is 5 to 10 mm.³ which, in a favorable construction, corresponds to a stroke of 1 to 2 mm.

of the preliminary injection piston. It follows, therefore, that the preliminary injection piston must begin to clear the aforementioned opening not later than upon completion of half of its stroke. At low engine speed, however, an opening of smaller cross-section is sufficient, and for this reason the preliminary injection piston is not displaced through its full stroke. Consequently, the amount of preliminary injection will be correspondingly smaller than at high engine speeds.

It is a further disadvantage of the injection valves known in the prior art that the fuel flows along a path having several 90° deflections and sudden changes in cross-section. This is unfavorable from the point of view of flow dynamics resulting in pressure losses and additional temperature increases that may cause major leakage losses.

Summary of the invention

Briefly stated, according to the present invention the fuel supplied by the main fuel line constantly exerts pressure on the preliminary injection piston and on a surface of the valve needle; the latter pressure tending to unseat said needle. Stop means in the form of an abutment is provided for limiting the stroke of the preliminary injection piston in its chamber, and after, and only after, the preliminary injection piston has come to a stop against the abutment may the fuel pressure rise to such an extent that the valve needle is subsequently moved against its spring bias. After having traveled a predetermined stroke, the valve needle allows the main injection to take place by establishing direct communication between the main fuel line and the discharge outlet of the injection valve bypassing the preliminary injection piston.

The space between the preliminary injection piston and the pressure chamber of the injection valve should advantageously be relieved of pressure after each main injection operation in order to effectively eliminate any possible negative pressures or excess pressures, and also, in order to attain a uniform reloading of this chamber necessary for ensuring a constant amount of preliminary injection. For this purpose, a further feature of the present invention provides that the spaces separated by the preliminary injection piston are connected by means of a channel which is provided with a check valve adapted to open in the direction of the fuel line. The channel with the check valve is preferably disposed within and along the major axis of the preliminary injection piston.

In the injection valves of the prior art the tension of the spring urging the valve needle against its seat is adjusted by means of a loading piston. This requires relatively large structural dimensions since the loading piston and the preliminary injection piston are arranged, due to operational considerations, within the nozzle holder. Since in the fuel injection valve proposed by the present invention a loading piston is not required, the preliminary injection piston is disposed, according to still another feature of the invention, within the nozzle body which contains the valve needle and which is provided with the discharge outlet.

In view of the foregoing, it can be seen that a principal object of this invention is to provide an improved fuel injection valve for preliminary and subsequent main injections where the amount of preliminary injection is held substantially constant and is independent of the engine speed.

Another object of the invention is to provide a fuel injection valve of the type described and in which possible negative or excess pressures are eliminated and a uniform reloading of the valve for ensuring a constant amount of preliminary injection is attained.

Still another object of the invention is to provide a fuel injection valve of the type described in which a loading piston is not required and in which the preliminary injection valve is located within the valve needle nozzle body.

Brief description of the drawings

FIG. 1 is a longitudinal sectional view of the novel fuel injection valve; and

FIG. 2 is an enlarged longitudinal sectional view of the nozzle body of the fuel injection valve shown in FIG. 1.

Description of the preferred embodiment

Turning now to FIGURE 1, there is shown a cylindrical nozzle body 1 securely clamped to a nozzle holder 3 by means of a cap screw 2. An intermediate apertured block 4 is disposed between the nozzle body 1 and the nozzle holder 3. As shown in FIGURE 2, nozzle body 1 includes an axial bore and a shank portion 2a projecting beyond an aperture of screw 2. The terminal portion of said shank portion 2a includes a discharge outlet formed by a plurality of nozzle holes 1a. A valve needle 5, slidably positioned within the axial bore of nozzle body 1, is urged against the valve seat 19 (FIGURE 2) by a spring 6 disposed in spring chamber 9 of the nozzle holder 3 (FIGURE 1). The spring 6 exerts pressure on the valve needle 5 by means of an insert 7 disposed betwen the valve needle 5 and the spring 6. At its end remote from insert 7, the spring 6 urges a spring seat disc 10 against the end face 8 of the spring chamber 9. The thickness of spring seat disc 10 determines the tension of spring 6 which, in turn, determines the opening pressure at the valve seat 19. Any fuel leaking into the spring chamber 9 is returned to the fuel tank through a leakage channel 11 extending within the nozzle holder 3 and through a leakage line (not shown).

The fuel under pressure flows into a channel 12 extending within the nozzle holder 3 from a fuel supply line (not shown) extending from an injection pump (not shown). Channel 12 communicates with an open annular channel 13 (FIGURE 2) machined in the face of nozzle body 1.

As shown in FIGURE 2, the valve needle 5 is stepped and, in the order of the decreasing diameters towards the discharge outlet 1a, comprises portions 5a, 5b and 5c. Portions 5a is reciprocable in the axial bore portions 4a of nozzle body 1 with a sealing fit and separates the spring chamber 9 in the nozzle holder 3 from an annular space or pressure chamber 16 which is an enlargement of the axial bore and is disposed below the needle portion 5a. The annular space 16 is delimited, on the one hand, by the nozzle body 1 and, on the other hand, by the valve needle 5 and is in communication with the annular channel 13 by means of a passage 17. The adjacent ends of needle portions 5a and 5b form a shoulder 5d which, as will be discussed later, is adapted to be exposed to the fuel pressure in chamber 16 in the opening direction of valve needle 5.

One part of needle portion 5b remote from the shoulder 5d is guided in a sealing fit in the bore portion 4b disposed immediately below chamber 16. During operation, the needle portion 5b is adapted to clear bore 4b and raise entirely into chamber 16. In such a position of the valve needle 5, communication is established between chamber 16 and a pressure chamber 18 disposed adjacent thereto. Chamber 18, similarly to chamber 16, is an enlargement of the axial bore in nozzle body 1 and is delimited by the nozzle body 1 and the valve needle 5. The adjacent ends of needle portions 5b and 5c form a shoulder 5e, while at its free end the portions 5c terminates in a frustoconical surface 5f adapted to engage seat 19. Portion 5c is of such a reduced diameter that a clearance 4c is provided between portion 5c and the axial bore of body 1. This clearance is wide enough to ensure a sufficient flow of fuel when the valve needle 5 is unseated as it will be described later.

The pressure chamber 18 is connected by means of a passage 20 with a pilot chamber 21 provided within the nozzle body 1 and extending laterally of the axial bore thereof. Pilot chamber 21 is also in communication with annular channel 13. A preliminary injection piston 22 is slidably positioned in pilot chamber 21 and is maintained in its position of rest by means of a return spring 23. In this rest position, one end face of piston 22 engages the intermediate block 4 (FIGURE 1). The length of stroke of the preliminary injection piston 22 is determined by an abutment 24. Within the preliminary injection piston 22 there extends an axial discharge channel 25 provided with a check valve comprising a valve piston 26 having a conical head 26a and a spring 27 urging the check valve into an open position.

The fuel forced under pressure from the main fuel line through channel 12 (FIGURE 1) into channel 13 exerts direct pressure, on the one hand, against valve piston 26 of preliminary injection piston 22 and, on the other hand, through channel 17, against shoulder 5d. As the fuel pressure increases and overcomes the force of spring 27, the check valve 26 closes. With further increase of the fuel pressure, piston 22 tends to shift toward the abutment 24, compressing thereby the fuel in pilot chamber 21, pressure chamber 18 and clearance 4c. The fuel thus pressurized exerts a force in an opening direction on shoulder 5e and surface 5f. When a predetermined fuel pressure has been attained in the main fuel line and thus in channel 13, the preliminary injection piston 22 is displaced towards and as far as the abutment 24, whereby the valve needle 5 will raise from the valve seat 19 against the force of the spring 6 and an amount of fuel determined by the stroke and the diameter of the preliminary injection piston 22 will be forced through discharge outlet 1a. It is to be noted that valve 5 is lifted into its position for preliminary injection by the combined pressure of fuel against shoulder 5d in chamber 16 and against shoulder 5e in chamber 18. At this time the needle portion 5b has not yet cleared bore portion 4b, since the fuel pressures are adapted to overcome only partially the force of spring 6. Once the preliminary injection piston 22 has come to rest against the abutment 24 and the preliminary injection has taken place, the injection process is interrupted due to the lack of a further supply of fuel to the pressure chamber 18 from the main line. The pressure of the fuel supplied by the injection pump gradually rises in chamber 16 to such a further predetermined value that the force exerted against shoulder 5d becomes sufficiently large to further displace the valve needle 5 against the preset force of the spring 6. As a result of this further displacement, the needle portion 5b will clear the bore portion 4b thereby establishing communication between chamber 16 and discharge outlet 1a. The main injection will thus begin.

When the injection pump is de-energized at the end of the injection process, the pressure in the fuel line will drop and the valve needle will close by virtue of spring 6, terminating the injection operation. Any excess pressures or negative pressures which might remain in the pressure chamber 18 and pilot chamber 21, as compared to the pressure in the fuel supply line, will be equalized during the intervals between the injection operations by reason of check valve 26 being in its open position. A uniform charge of the pilot chamber 21 essential for a constant quantity of preliminary injection will thus be ensured.

What is claimed is:

1. A fuel injection valve of the type supplied with fuel from a main fuel line for a preliminary and a subsequent main injection including a body having an axial bore, a valve needle reciprocably disposed in said bore and urged against a valve seat by a first spring means to close off a discharge outlet at one end of said bore, a preliminary injection piston reciprocable in a pilot chamber communicating with said axial bore and urged against the pressure in said fuel line by a second spring means, said piston adapted to increase the pressure in said pilot chamber and to force fuel therefrom through said discharge outlet, the improvement comprising:

(a) means disposed in said body and directly responsive to the pressure in said pilot chamber and in said fuel line to cause a first displacement of said valve needle against said first spring means sufficient to allow fuel flow only from said pilot chamber through said discharge outlet when the pressure in said fuel line reaches a first predetermined value and to cause further displacement of said valve needle against said first spring means to allow fuel flow from said fuel line through said discharge outlet when the pressure in said fuel line reaches a second predetermined value larger than said first value, (b) means in said body for establishing communication between said fuel line and said discharge outlet when the pressure in said fuel line reaches said second value, and (c) means to ensure that all the fuel to be forced from said pilot chamber by said preliminary injection piston is actually forced therefrom before communication is established between said fuel line and said discharge outlet.

2. The fuel injection valve as claimed in claim 1, wherein said means to ensure full discharge from said pilot chamber comprises stop means to limit the stroke of said piston to a predetermined value, said first spring means adapted to be adjusted so that said further displacement of said valve needle takes place only upon engagement of said piston with said stop means.

3. The fuel injection valve claimed in claim 2, wherein said communication between said fuel line and said discharge outlet bypasses said preliminary injection piston when the pressure in said fuel line reaches said second value.

4. A fuel injection valve as defined in claim 3, wherein said valve needle comprises at least a first, a second and a third axially aligned integral portion of decreasing diameter towards said discharge outlet, said body including a first pressure chamber in continuous communication with said main fuel line and formed as an enlargement of said axial bore, a second pressure chamber spaced from said first pressure chamber toward said discharge outlet and formed as an enlargement of said axial bore, said second chamber being in continuous communication with said pilot chamber, the junction of said first needle portion of largest diameter with said second needle portion defining a first shoulder exposed to the fuel pressure in said first pressure chamber in a direction away from said discharge outlet, said second needle portion being sealingly reciprocable in said axial bore between said first pressure chamber and said second pressure chamber, the junction of said second needle portion and said third needle portion defining a second shoulder exposed to the fuel pressure in said pilot chamber in a direction away from said discharge outlet, said second needle portion adapted to clear said axial bore between said first and second pressure chambers for establishing communication between said fuel line and said discharge outlet through said first and second pressure chambers.

5. A fuel injection valve as defined in claim 4, wherein said preliminary injection piston includes passage means establishing one way communication from said second chamber to said fuel line and check valve means permitting fuel flow from said second chamber to said fuel line when the pressure in said second chamber exceeds that of the fuel in said fuel line.

6. A fuel injection valve as defined in claim 1, wherein said pilot chamber is disposed in said body laterally of said axial bore.

7. A fuel injection valve as defined in claim 2, wherein said stop means comprises an abutment means located in said pilot chamber.

8. A fuel injection valve as claimed in claim 5, wherein said check valve is located so as to close in response to an increase in pressure in said fuel line so as to ensure filling of said pilot chamber with a constant amount of fuel but to close upon a further increase of pressure in the main fuel line to cooperate with said preliminary injection piston to pressurize the fuel in said pilot chamber in response to the further increase in pressure in said main fuel line and further to open in a subsequent decrease in pressure in said main fuel line to prevent negative pressures in said chamber.

References Cited
UNITED STATES PATENTS 2,813,752   11/1957   Pringham _____ 239—91

EVERETT W. KIRBY, *Primary Examiner.*

UNITED STATES PATENT OFFICE
CERTIFICATE OF CORRECTION

Patent No. 3,391,871                July 9, 1968

Volkmar Fleischer et al.

It is certified that error appears in the above identified patent and that said Letters Patent are hereby corrected as shown below:

In the heading to the printed specification, between lines 7 and 8, insert -- Claims priority, application Germany, Mar. 30, 1966, B 86423 --.

Signed and sealed this 18th day of November 1969.

(SEAL)
Attest:

Edward M. Fletcher, Jr.
Attesting Officer

WILLIAM E. SCHUYLER, JR.
                                           Commissioner of Patents